(12) United States Patent
Wegner et al.

(10) Patent No.: US 8,113,182 B2
(45) Date of Patent: Feb. 14, 2012

(54) INTEGRATED SUPERCHARGER MODULE

(75) Inventors: Jürgen Wegner, Eislingen/Fils (DE); Joachim Huster, Berg (DE); Georg Ruetz, Immenstaad (DE)

(73) Assignee: Behr GmbH & Co. KG, Stuttgart (DE)

( * ) Notice: Subject to any disclaimer, the term of this patent is extended or adjusted under 35 U.S.C. 154(b) by 897 days.

(21) Appl. No.: 12/125,266

(22) Filed: May 22, 2008

(65) Prior Publication Data

US 2009/0211244 A1 Aug. 27, 2009

(30) Foreign Application Priority Data

May 24, 2007 (DE) .................. 10 2007 024 631

(51) Int. Cl.
  *F02B 33/00* (2006.01)
  *F02B 47/08* (2006.01)
  *F02M 25/07* (2006.01)
  *F02D 23/00* (2006.01)
  *F03B 1/00* (2006.01)
  *F03B 11/02* (2006.01)
  *F03D 5/00* (2006.01)

(52) U.S. Cl. ............... 123/559.1; 123/563; 123/568.12; 60/602; 415/208.1

(58) Field of Classification Search .................. 123/563, 123/559.1, 568.12; 60/602; 415/208.1
See application file for complete search history.

(56) References Cited

U.S. PATENT DOCUMENTS

| 1,310,682 | A |  | 7/1919 | Sherbondy |  |
|---|---|---|---|---|---|
| 4,196,593 | A |  | 4/1980 | Froeliger |  |
| 4,344,289 | A |  | 8/1982 | Curiel et al. |  |
| 5,697,217 | A |  | 12/1997 | Ramsden et al. |  |
| 6,073,616 | A |  | 6/2000 | Hedman |  |
| 6,805,108 | B2 | * | 10/2004 | Shaffer et al. | 123/563 |
| 6,957,689 | B2 | * | 10/2005 | Ambros et al. | 165/41 |
| 7,011,079 | B2 | * | 3/2006 | Park | 123/559.1 |
| 7,302,800 | B2 | * | 12/2007 | Klingel | 60/612 |
| 7,461,508 | B2 | * | 12/2008 | Rosin et al. | 60/612 |
| 2002/0056444 | A1 |  | 5/2002 | Chou et al. |  |
| 2004/0118389 | A1 |  | 6/2004 | Shaffer et al. |  |
| 2005/0198957 | A1 | * | 9/2005 | Kim | 60/612 |
| 2006/0278377 | A1 |  | 12/2006 | Martins et al. |  |
| 2007/0119431 | A1 | * | 5/2007 | Harada et al. | 123/563 |
| 2009/0084364 | A1 | * | 4/2009 | Martins et al. | 123/563 |
| 2009/0139474 | A1 | * | 6/2009 | Mokire | 123/41.58 |
| 2009/0145409 | A1 | * | 6/2009 | Noyama et al. | 123/542 |
| 2010/0043761 | A1 | * | 2/2010 | Joergl et al. | 123/563 |

(Continued)

FOREIGN PATENT DOCUMENTS

DE 2441354 3/1976

(Continued)

OTHER PUBLICATIONS

European Office Action for EP 08 009 353.7, dated May 21, 2010.

(Continued)

*Primary Examiner* — Thomas Denion
*Assistant Examiner* — Cameron Setayesh
(74) *Attorney, Agent, or Firm* — Bachman & LaPointe, P.C.

(57) ABSTRACT

Integrated supercharger module having a low-pressure charging device (2) having a low-pressure compressor housing (4), a high-pressure charging device (3) having a high-pressure compressor housing (5), a turbine (9) and a cooler arrangement, wherein the low-pressure charging device (2), the high-pressure charging device (3), the turbine (9) and the cooler arrangement form a structural unit.

14 Claims, 1 Drawing Sheet

U.S. PATENT DOCUMENTS

2010/0071639 A1* 3/2010 Wegner et al. .............. 123/41.08
2010/0089342 A1* 4/2010 Wegner et al. .............. 123/41.08

FOREIGN PATENT DOCUMENTS

| | | |
|---|---|---|
| DE | 7933253 | 7/1980 |
| DE | 2943729 | 5/1981 |
| DE | 3514670 A1 | 10/1986 |
| DE | 19822874 A1 | 11/1999 |
| DE | 19948220 A1 | 1/2001 |
| DE | 10118951 A1 | 10/2002 |
| DE | 10230934 A1 | 1/2004 |
| DE | 102004045661 | 4/2006 |
| DE | 19853455 B4 | 6/2006 |
| DE | 102005017970 | 11/2006 |
| DE | 102005025602 | 12/2006 |
| DE | 102005036045 | 2/2007 |
| EP | 0874142 | 10/1998 |
| EP | 1057978 A2 | 12/2000 |
| EP | 1170478 | 1/2002 |
| FR | 2856747 A1 | 12/2004 |
| GB | 1438172 A | 6/1976 |

OTHER PUBLICATIONS

H. Ebertshauser; Fluidtechnik von A bis Z; Vereinigte Fachverlage—Krausskopf/Ingenieur-Digest; pp. 91, 95, 134.

* cited by examiner

INTEGRATED SUPERCHARGER MODULE

BACKGROUND OF THE INVENTION

The present invention relates to an integrated supercharger module as used, for example, in motor vehicles.

From the state of the art it is known that the power of an internal combustion engine can be increased when a turbosupercharger is additionally employed. In doing so the heated air charge of the turbosupercharger must be cooled before entering the combustion chamber of the engine. This is usually done with the aid of an air charge cooler. In the case of multistage compression of the air charge an intermediate cooler is arranged between a low-pressure compressor and a high-pressure compressor and after the high-pressure compressor a further high-pressure air charge cooler is arranged.

Since the inlets and outlets of the individual compressors according to the state of the art are spaced quite far apart costly connecting elements each having a long line path had to be used hitherto for the intermediate cooler arranged in between. This entails a pressure loss for the air charge which essentially results from a pattern that is not optimum in terms of flow and the great length of the line paths. The spatial course of the lines is primarily determined by the main components in the engine compartment and is dependent on the remaining open spaces. This applies correspondingly to the connecting elements of a high-pressure air charge cooler.

For the purpose of optimum air charge flow guidance efforts are made to construct each of the connecting elements between a cooler and a compressor as short as possible and preferably with their longitudinal axis having a substantially linear path. By this means the pressure drop in the air charge flow can be reduced and the efficiency of the supercharger module increased.

SUMMARY OF THE INVENTION

The present invention sets itself the task of providing an improved supercharger module.

This task is solved according to the invention by an integrated supercharger module according to the invention.

An integrated supercharger module according to the invention which can be used in particular in motor vehicles comprises a low-pressure charging device having a low-pressure compressor housing, a high-pressure charging device having a high-pressure compressor housing, a turbine and a cooler arrangement, wherein the low-pressure charging device, the high-pressure charging device, the turbine and the cooler arrangement form a structural unit. As a result the air charge need travel only a short way in the integrated supercharger module. In this way the pressure loss is reduced.

Advantageously the required installation space for the pressure charging devices and the cooler arrangement is reduced due to the compact arrangement of the integrated supercharger module according to the invention and the pressure charging devices in comparison with an arrangement according to the state of the art.

The pressure charging devices can each be connected directly or via a connecting part to the associated coolers of the cooler arrangement. Correspondingly the turbine is also connected directly or via a connecting part to the exhaust gas cooler.

A direct connection can comprise a flange on at least one compressor housing, wherein compressed air and at least one stream of coolant flow through the cross-section of the flange. A corresponding flange on a cooler of the cooler arrangement can preferably be bolted, engaged, adhesively bonded and/or welded to the flange of the compressor housing, but customary fastening means according to the state of the art may also be employed.

In the case of a joint with the aid of a connecting part the joint is constructed as a connecting part between an outlet or inlet of a pressure charging device and an inlet or outlet of the cooler of the cooler arrangement, wherein a first side of the connecting part substantially corresponds in cross-section to the inlet or outlet of a pressure charging device and a second side of the connecting part substantially corresponds in cross-section to the inlet or outlet of the cooler. The cross-section of the first side and the cross-section of the second side of the connecting part are usually different. The second cross-section has the shape of an inlet for the cooler which is preferably rectangular or square.

Another advantage of an integrated supercharger module according to the invention may consist in that the latter can advantageously easily be exchanged or be dismantled and installed for repairs on account of the indirect connections on the interfaces to the pressure charging devices and to the exhaust gas cooler.

A flow channel in the cooling device has a longitudinal direction which preferably is identical to the main flow direction of the air passing through. The flow channel is preferably constructed in the shape of a substantially circular cross-section, but other cross-sectional shapes diverging from this are also possible. The longitudinal axis of the flow channel may run in a straight line or a curve.

The cooler arrangement in an integrated supercharger module according to the invention preferably comprises an intermediate cooler, a high-pressure air charge cooler and/or an exhaust gas cooler.

The low-pressure charging device and/or the high-pressure charging device of an integrated supercharger module according to the invention preferably comprise an axial inlet and preferably a radial outlet. This allows, on the one hand, space-saving construction of the components and of the entire supercharger module and, on the other hand, the preferably radial outlet for the compressed air charge ensures a pressure drop that is as low as possible.

In an integrated supercharger module according to the invention the low-pressure charging device, the high-pressure charging device and the turbine preferably have a common axis of rotation, in particular a common shaft. As a result the intermediate cooler can preferably be arranged in the region of the engine between the pressure charging devices with correspondingly short connecting parts.

An integrated supercharger module according to the invention preferably comprises a coolant plate which preferably comprises a coolant conduit for at least one, preferably both coolers of the cooler arrangement and is fastenable to one or both coolers of the cooler arrangement.

By this means the two functions of fastening the cooler or coolers and the coolant conduit can advantageously be combined in one component and so a particularly compact supercharger module can be achieved.

In an integrated supercharger module according to the invention the air charge flow preferably runs in substantially linear manner in sections. By this means the air charge flow is only slightly turbulent and the pressure drop reduced.

In an integrated supercharger module according to the invention a supercharger module axis runs through the centre of the inlet of the low-pressure charging device and the centre of the outlet of the high-pressure air charge cooler. This axis is preferably substantially identical to the longitudinal axis of the high-pressure air charge cooler. Additionally or alternatively the supercharger module axis is preferably substantially parallel both to the longitudinal axis of the intermediate cooler and to the longitudinal axis of the exhaust gas cooler. This likewise results in a reduced pressure loss and, furthermore, the required installation space is lower than in an arrangement according to the state of the art.

In an integrated supercharger module according to the invention the air charge stream flows through the pressure charging devices and the coolers of the cooler arrangement preferably in a substantially horizontal direction.

A cooler of the cooler arrangement and a pressure charging device in an integrated supercharger module according to the invention are preferably connected via a connecting part, wherein the length of the connecting part in the flow direction is preferably less than the length of the cooler of the cooling arrangement. By this means a compact arrangement of the components of an integrated supercharger module according to the invention is achieved and the flow guidance of the air charge stream is improved.

In the low-pressure compressor housing flow channels are advantageously constructed as feed/discharge channels for the coolant. Such feed/discharge channels may alternatively or additionally be constructed in the high-pressure compressor housing. Their cross-section is preferably constructed in the shape of a substantially circular cross-section, but other cross-sectional shapes diverging from this are also possible. These flow channels can advantageously be connected to a coolant circuit of an air-conditioning system. Thus, the connectors for the coolant lines from an air-conditioning system to the flow channels in a compressor housing can be of more stable construction.

A key advantage of the invention consists in the compact construction of the integrated supercharger module, wherein in particular the arrangement of the components for the multistage compressor unit and the cooler arrangement with regard to their extension in the engine transverse axis direction is shortened, which allows the accommodation of additional components or an improved run of lines for components in the engine compartment.

In one embodiment the intermediate cooler can be integrated or accommodated in one or both compressor housings, the compressor housing extending from an inlet or outlet in a longitudinal direction in such a way that the intermediate cooler can be accommodated therein.

The intermediate cooler and/or the high-pressure air charge cooler are preferably shell-and-tube coolers since due to their compact structure along their longitudinal direction they have a high volume power density for the heat to be carried off. However, other heat exchangers having a compact structure are also possible.

Preferably the flow channels for the coolant exhibit inlet/outlet cross-sections in a compressor housing which can be arranged substantially in a plane. The flow channels for the coolant in the compressor housing are moreover preferably arranged beside one another as a result of which advantageously a compact arrangement of the flow channels for the compressor housing results.

Advantageously, on account of the indirect fastening of the intermediate cooler between the compressor housings fastening elements are not necessary. The elimination of the hitherto required fastening elements for the intermediate cooler on the engine advantageously ensures a reduction in the weight of the multistage compressor unit and of the cooler arrangement and increases flexibility with regard to the arrangement of the coolers of the cooler arrangement in the region of the engine.

Preferably at least one flow channel is arranged inside the intermediate cooler housing and at least one other flow channel outside the intermediate cooler housing. Advantageously the coolant flowing out of the intermediate cooler and heated by the air charge is carried off in a flow channel arranged outside the intermediate cooler housing. Thus, the coolant carried off outside the intermediate cooler housing can advantageously on the way to the air-conditioning system give off some of its heat via the flow channels to the surroundings and does not heat the air charge.

Advantageously a low-loss air charge conduit may result in the connecting regions between the coolers of the cooler arrangement and the pressure charging devices because, on the one hand, the air charge need only travel a short way in the connecting regions and, on the other hand, the air charge need not be diverted in the connecting regions since the air charge emerges from an exit cross-section in the main flow direction of the air charge.

Connecting regions of short construction between the coolers of the cooler arrangement and the pressure charging devices with correspondingly small air charge volumes are particularly advantageous with regard to noise production in the coolers since the resonant frequencies of the air charge volume in the connecting regions are advantageously shifted due to the short spacing between cooler and the pressure charging devices.

From small air charge volumes in said connecting regions there further results a shortened response time from the engine to a desired increase in speed on the part of the driver. The additional engine power can then be provided more rapidly.

BRIEF DESCRIPTION OF THE DRAWINGS

Other advantages, characteristics and possible applications of the present invention emerge from the following description in association with the figures. These show in partially schematic form.

DETAILED DESCRIPTION

Figure 1:
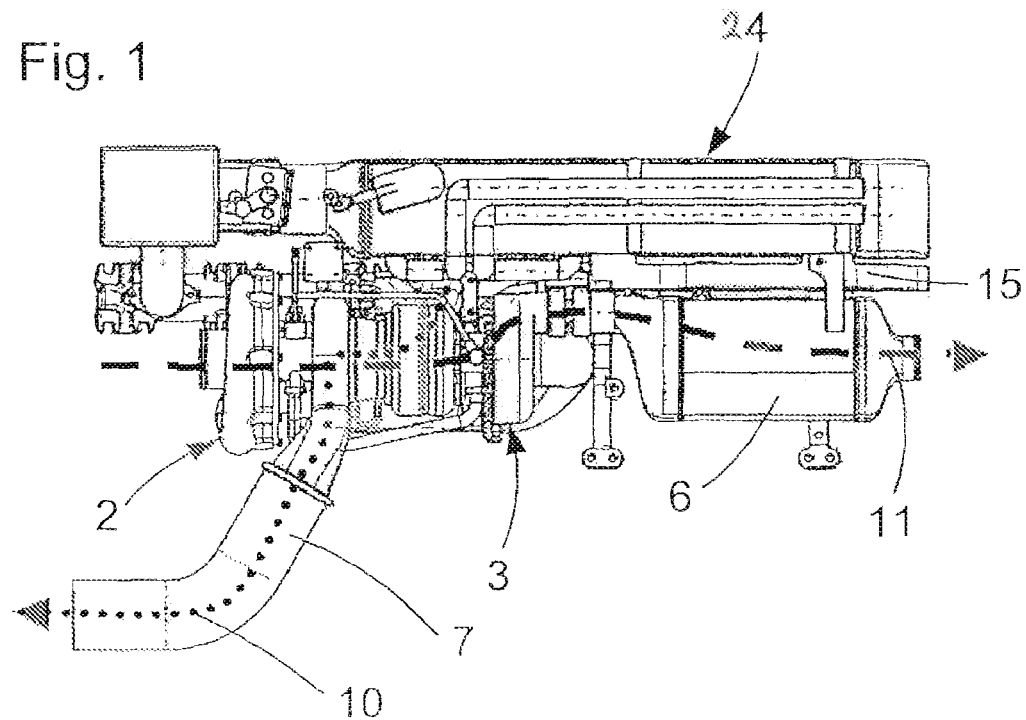
FIG. 1 a side elevation of an integrated supercharger module according to a version of the present invention.

FIG. 1 shows a side elevation of the integrated supercharger module according to an embodiment of the present invention. A multistage compressor unit comprises a low-pressure compressor 2, having a low-pressure compressor housing 4 (See also FIG. 2) and a low-pressure compressor outlet extending into a channel in the main flow direction of the air charge 11, and a high-pressure compressor 3 having a high-pressure compressor housing 5. Between the two compressors 2, 3 a turbine 9 is arranged. A cooler arrangement comprises an intermediate cooler 1, a high-pressure air charge cooler 6 and/or an exhaust gas cooler 24.

The air charge mass flow 11 (shown by a dashed line) flows through the compressors 2, 3 and the associated coolers 1, 6 in a substantially horizontal direction. The centre of the admission cross-section of the low-pressure compressor 2 and the centre of the exit cross-section of the high-pressure air charge cooler 6 form a line that runs substantially horizontally.

The exhaust gas mass flow 10 (shown by a dotted line) passes from the exhaust gas cooler 24 into the turbine 9 and by acting in conjunction with the turbine blades ensures the rotation of an internal shaft (not shown). The exhaust stream is then carried away out of the turbine housing in the tangential direction and runs into an exhaust gas pipe 7 which carries the exhaust gas mass flow 10 in the direction of the exhaust gas unit of the vehicle (not shown). The low-pressure compressor 2 and the high-pressure compressor 3 are jointly driven by the shaft described above which extends from the interior of the turbine 9 in the direction of the compressors 2, 3.

In its inlet and outlet cross-section the high-pressure air charge cooler 6 has a substantially rectangular cross-section. The inlet cross-section of the high-pressure air charge cooler 6 is enlarged with respect to the inlet cross-section of the connecting part 12 in order to enlarge the heat transfer surface of the housing of the high-pressure air charge cooler 6. The heat transfer from the air charge mass flow 11 ensues substantially via the surface of the high-pressure air charge cooler 6 to a stream of air flowing through this housing.

The exhaust gas cooler 24 is arranged substantially above the compressors 2, 3 and above the high-pressure air charge cooler 6. The high-pressure air charge cooler 6 and the exhaust gas cooler 24 are arranged on opposite sides of a coolant plate 15 and connected to the latter, for example bolted, welded, soldered or adhesively bonded directly or via struts. The integrated supercharger module can for its part be fastened as a whole to an engine of a motor vehicle (not shown), for example via struts.

Figure 2:
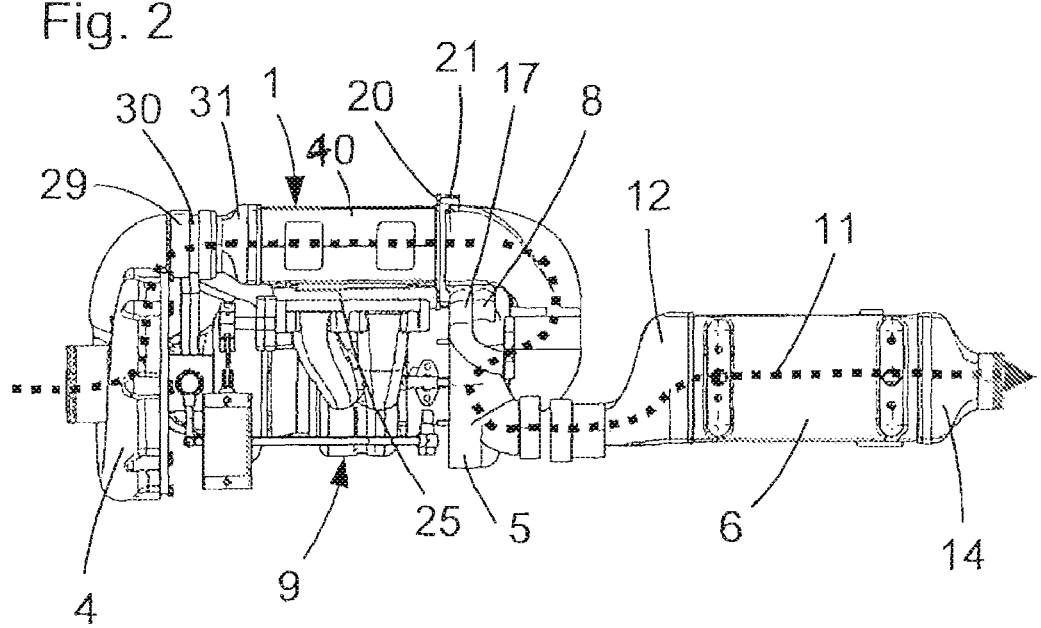
FIG. 2 a plan view of the integrated supercharger module in FIG. 1 in which the exhaust gas cooler is not illustrated.

FIG. 2 shows a plan view of the multistage compressor unit with intermediate cooler 1 and high-pressure air charge cooler 6 according to FIG. 1. The exhaust gas cooler 24 and the exhaust gas line 7 are not illustrated. The course of the air charge mass flow 11 through the multistage compressor unit is shown by dotted lines. The course here is substantially on a plane defined by three points. The first point is formed by the centre of the inlet for the low-pressure compressor 2. The second point is formed by the centre of the outlet 14 of the high-pressure air charge cooler 6. The third point is formed by the centre of the inlet of the intermediate cooler 1. The compact arrangement of the compressors 2, 3 and the cooling devices 1, 6, 24 along the longitudinal axis of the integrated supercharger module is clearly discernible in this view. The same applies to the associated connecting parts 12, 30 which exhibit only a short length for the associated longitudinal axis of the component. The flow guidance of the air charge mass flow 11 through the cooling devices 1, 6 ensues substantially in the main flow direction without bringing about diversion at the inlet or outlet in question.

The low-pressure compressor housing 4 is connected via a connecting part in the form of a coupler 30 to an inlet for a diffuser 31 for the intermediate cooler 1, wherein the coupler 30 is constructed as a one-piece part. The low-pressure compressor housing 4 has on one side a connecting pipe 29 having an internal diameter which is substantially identical to the external diameter of the coupler 30 so that the coupler 30 is fixed by friction in the connecting pipe 29. On a first side (in the region of the coupler 30) the diffuser 31 has a cross-section which differs from the cross-section of a second side (in the region of the inlet of the intermediate cooler 1). The first side has the shape of a circle while the second side substantially exhibits the rectangular shape for example of the inlet cross-section for the intermediate cooler 1. Furthermore, the first side has an internal diameter for accommodating the coupler 30 which is substantially identical to the external diameter of the coupler 30 so that the coupler 30 is fixed by friction in the diffuser 31. Advantageously the air charge 11 is not diverted on leaving the low-pressure compressor housing 4.

Despite the compact structure only a few diversions of the air charge mass flow 11 through the multistage compressor unit are required. On the way through the compressors 2, 3 the air charge mass flow is deflected homogeneously in each case as a result of which the pressure loss between the inlet and outlet of a compressor 2, 3 turns out to be correspondingly low. The high-pressure compressor housing 5 has on one side a flow channel for a feed 17 and on the other side a flow channel for a discharge 8 of coolant for the intermediate cooler 1. The cross-sections in the end region of these flow channels for outlet and inlet cross-sections are each arranged beside one another in a plane. The flow channels 17, 8 for the coolant supply of the intermediate cooler 1 are each constructed in the high-pressure compressor housing 5. In the region of the inlet the connecting part 12 has a substantially circular cross-section while the cross-section of the connecting part 12 at the outlet substantially has a shape adapted to the cross-section of the high pressure air charge cooler 6. The turbine 9 is acted upon by the exhaust gases from the engine space and drives the compressors 2, 3.

The intermediate cooler 1 is a shell-and-tube cooler which is simply passed through. The intermediate cooler 1 has an outlet with an associated intermediate cooler flange 20 which is bolted to a high-pressure compressor flange 21 on an inlet on the high-pressure compressor housing 5. The intermediate cooler flange 20 has cross-sections traversed in one case by coolant counter to the main flow direction of the air charge 11 and in the other by compressed air from the intermediate cooler 1 in the main flow direction 11. The intermediate cooler 1 has a longitudinal axis which runs substantially in the outflow direction of the air charge 11 out of the low-pressure compressor housing 4.

The design of the intermediate cooler housing 40 is substantially rectangular. On one side of the intermediate cooler housing 40 extending from the intermediate cooler flange 20 into a region of the inlet of the intermediate cooler 1 counter to the main flow direction of the air charge 11 is a substantially cylindrical flow channel 25 having an outer wall, wherein the longitudinal direction thereof is substantially parallel to the main flow direction of the air charge 11. In this embodiment the flow channel 25 runs outside the intermediate cooler housing 40. In a modification that is not illustrated the flow channel 25 may also be integrated in the intermediate cooler housing 10. On a side of the flow channel 25 opposite the intermediate cooler flange 20 a coolant inlet extends at right angles to the main flow direction of the air charge 11 into the intermediate cooler 1. The coolant inlet has a substantially circular cross-section, wherein any other cross-sectional shapes are also possible. The coolant is supplied to the intermediate cooler 1 through a coolant inlet at a first temperature via and is heated during passage through the intermediate cooler 1 counter to the main flow direction of the air charge 11 to a second temperature which is higher than the first temperature. The coolant then leaves the intermediate cooler 1 at the coolant outlet and is fed back to the air conditioning system via the flow channel 25.

The invention claimed is:
1. Integrated supercharger module comprising a low-pressure charging device (2) having a low-pressure compressor housing (4), a high-pressure charging device (3) having a high-pressure compressor housing (5), a turbine (9) and a cooler arrangement comprising an intermediate cooler (1) and a high-pressure cooler (6),
   wherein the intermediate cooler (1) is between the low-pressure charging device (2) and the high-pressure charging device (3),
   wherein the low-pressure charging device (2), the high-pressure charging device (3), the turbine (9) and the cooler arrangement form a structural unit, wherein the low-pressure charging device (2), the high-pressure charging device (3) and the turbine (9) have a common axis of rotation, wherein a centre of an inlet to the low-pressure charging device (2) and a centre of an outlet from the high-pressure cooler (6) are along a common supercharger module axis, wherein an axis of the intermediate cooler (1) is parallel to the common supercharger module axis, and wherein at least one of the low-pressure compressor housing (4) and the high-pressure compressor housing (5) has an axial inlet and a radial outlet.

2. Integrated supercharger module according to claim 1, wherein the cooler arrangement further comprises an exhaust gas cooler (24).

3. Integrated supercharger module according to claim 1, wherein the low-pressure charging device (2) is connected to the intermediate cooler (1) directly or via a connecting part (30).

4. Integrated supercharger module according to claim 1, wherein the high-pressure charging device (3) is connected to the high-pressure cooler (6) directly or via a connecting part (12).

5. Integrated supercharger module according to claim 1, further comprising a coolant plate (15) having a coolant conduit for at least one cooler of the cooling arrangement and wherein the coolant plate (15) is fastened to one or both coolers of the cooler arrangement.

6. Integrated supercharger module according to claim 1, wherein the supercharger module axis is substantially identical to the longitudinal axis of the high-pressure air charge cooler (6).

7. Integrated supercharger module according to claim 2, wherein a longitudinal axis of the exhaust gas cooler (24) is substantially parallel to the supercharger module axis.

8. Integrated supercharger module according to claim 1, wherein the air charge flow flows through the low-pressure and high-pressure charging devices (2, 3) and the intermediate and high-pressure coolers (1, 6) in a substantially horizontal direction.

9. Integrated supercharger module according to claim 1, wherein at least one cooler of the intermediate cooler (1) and the high-pressure cooler (6) and at least one of low-pressure charging device (2) and high-pressure charging device (3) are connected via a connecting part (12, 13), wherein the length of the connecting part (12, 13) in the flow direction is less than the length of the at least one cooler (1, 6).

10. Integrated supercharger module according to claim 1, wherein flow channels for a coolant are constructed in the low-pressure compressor housing (4).

11. Integrated supercharger module according to claim 1, wherein flow channels for a coolant are constructed in the high-pressure compressor housing (5).

12. Integrated supercharger module according to claim 1, wherein the intermediate cooler (1) comprises a shell-and-tube cooler.

13. Integrated supercharger module according to claim 1, wherein the high-pressure air charge cooler (6) comprises a shell-and-tube cooler.

14. Integrated supercharger module according to claim 2, wherein the intermediate cooler (1), the high-pressure cooler (6) and/or the exhaust gas cooler (24) are connected to a coolant circuit of an air-conditioning system.

\* \* \* \* \*